Dec. 10, 1929.  B. K. FORD  1,739,298
METHOD OF AND APPARATUS FOR TESTING FLEXIBLE STRANDS
Filed Dec. 12, 1925   2 Sheets-Sheet 1
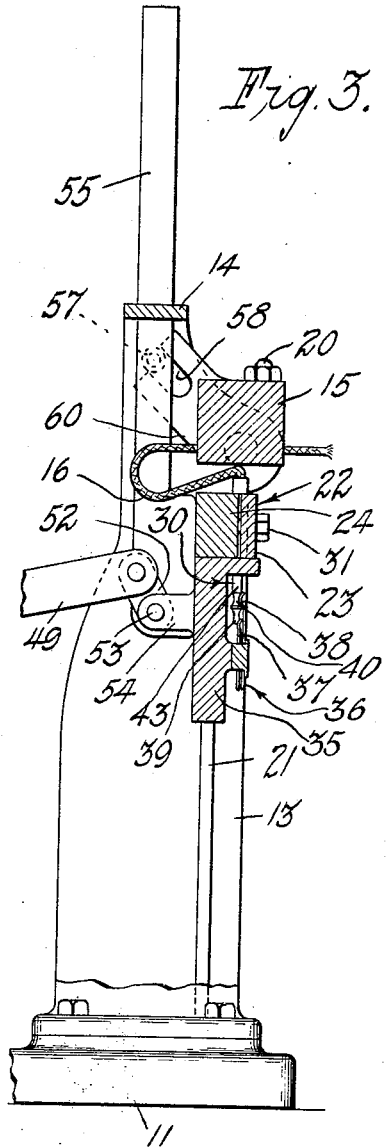
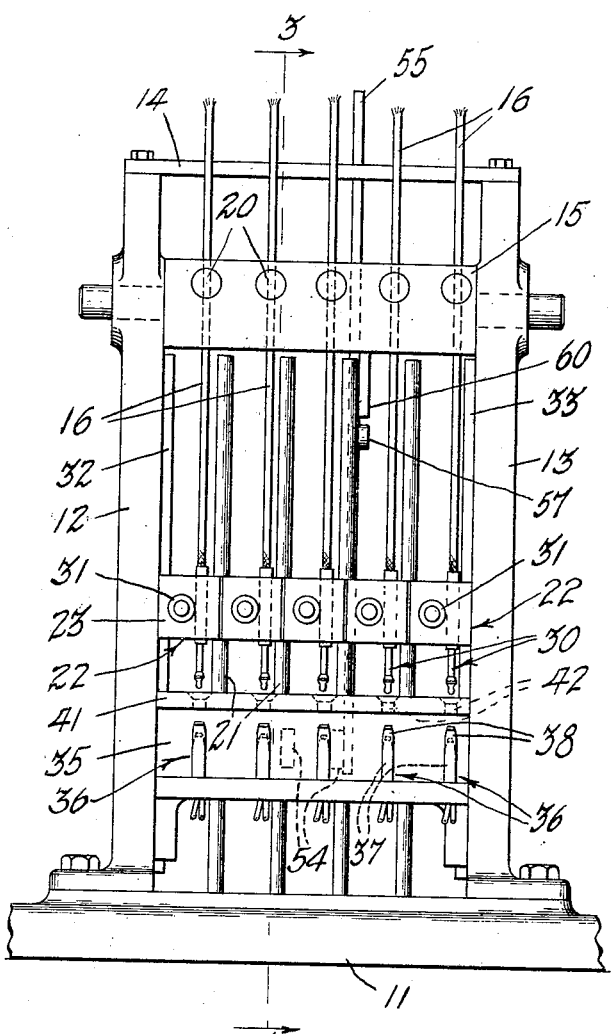
Inventor.
B. K. Ford,
by  [signature]
Atty.

Dec. 10, 1929.  B. K. FORD  1,739,298
METHOD OF AND APPARATUS FOR TESTING FLEXIBLE STRANDS
Filed Dec. 12, 1925   2 Sheets-Sheet 2
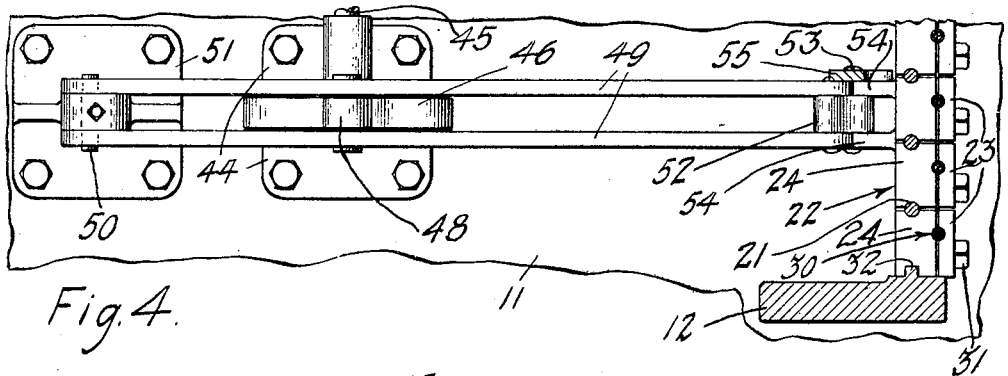
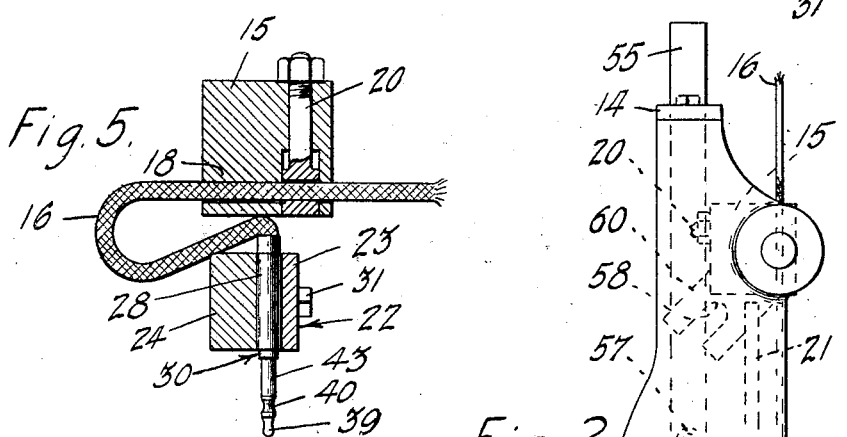
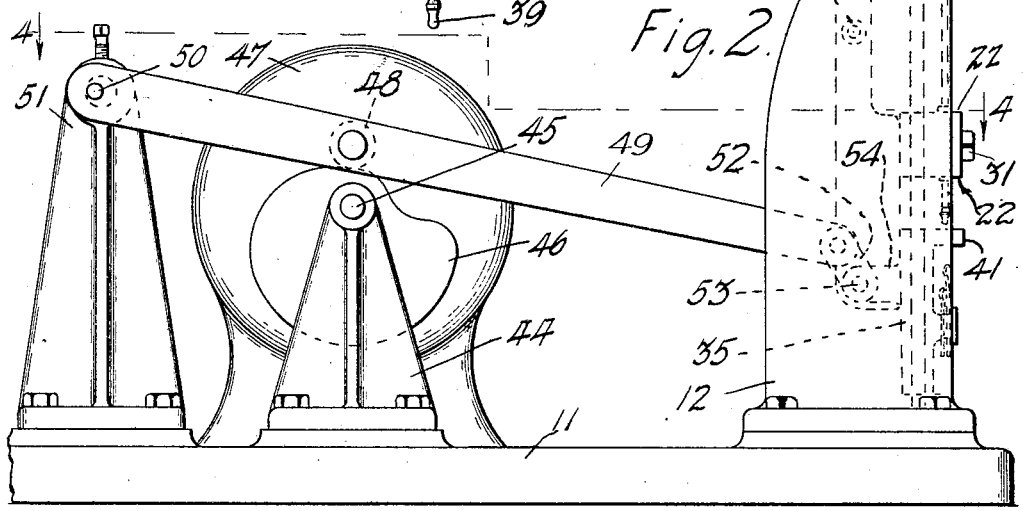
Inventor
B. K. Ford,
by  *Atty.*

Patented Dec. 10, 1929

1,739,298

UNITED STATES PATENT OFFICE

BEN KING FORD, OF OAK PARK, ILLINOIS, ASSIGNOR TO WESTERN ELECTRIC COMPANY, INCORPORATED, OF NEW YORK, N. Y., A CORPORATION OF NEW YORK

METHOD OF AND APPARATUS FOR TESTING FLEXIBLE STRANDS

Application filed December 12, 1925. Serial No. 75,018.

This invention relates to a method of and apparatus for testing flexible strands, and more particularly to a method of and apparatus for testing plug ended flexible electrical conductors.

It is frequently desirable to determine the probable period of time that a flexible strand structure will satisfactorily withstand the conditions to which it is subjected in the contemplated service. However, this period may, in actual service, extend over a considerable length of time, and furthermore, it is sometimes desirable to determine such period without placing the strand in actual service. Therefore, it is advantageous in some instances to subject the strand to conditions simulating those encountered in service but recurring with greater frequency, thus materially reducing the time required for testing but resulting in an accurate indication of the length of its active service life. Tests of this sort are particularly useful in predetermining the service life of flexible electrical conductors such as telephone cords terminating in plug terminals for engagement with jack terminals for interconnecting electrical circuits of a telephone switchboard.

The principal objects of the invention are to provide a method of and an apparatus for speedily and accurately testing a flexible strand having a connecting terminal.

Other objects of the invention are to provide an improved method of and an improved apparatus for testing plug ended flexible electrical conductors to determine their probable life in service.

In accordance with the general features of the invention, an improved method of testing the probable life of plug ended cords consists in repeatedly engaging the plug with and disengaging it from a jack under predetermined pressure and tension conditions, bending the portion of the cord adjacent to the plug, subjecting the bent portion to a predetermined frictional pressure, and then straightening the bent portion and subjecting the strand to a predetermined tension.

One embodiment of the invention is herein illustrated and described in connection with an apparatus for testing telephone switchboard cords wherein a plurality of jacks are moved upwardly in vertical guideways to engage plugs attached to the cords and supported by suitable clamps. The jacks with the plugs engaged therein continue to move upwardly until loops formed thereby in the depending cords are forced under a predetermined pressure against a frictional surface of a supporting member therefor. The plugs and jacks are then caused to drop suddenly until they reach their original positions, in doing which the jacks are suddenly disengaged from the plugs.

Other features and advantages of the invention will become apparent in the following detailed description, reference being had to the accompanying drawings, wherein Fig. 1 is a front elevation of an apparatus embodying the features of the invention and by means of which the improved method may be practiced;

Fig. 2 is an end elevation of the apparatus shown in Fig. 1;

Fig. 3 is a vertical section taken on the line 3—3 of Fig. 1 with the jacks in their uppermost positions and loops formed in the cords engaging the supporting member;

Fig. 4 is a fragmentary plan section taken on the line 4—4 of Fig. 2, and

Fig. 5 is an enlarged detail section of the cord and plug supporting members.

It is believed that the improved method will be clearly comprehended from a description of the apparatus by means of which it may be practiced.

Referring now to the drawings in detail the main supporting frame comprises a base member 11, a pair of spaced uprights 12 and 13, and an upper cross piece 14. Rotatably supported by the uprights 12 and 13 is a member 15 which is designed to hold a plurality of cords 16 to be tested, which cords may be of any usual type employed in telephone switchboards. The member 15 is provided with a plurality of apertures 18 (Fig. 5) for accommodating the cords 16 which are securely clamped therein by means of bolts 20.

Secured to the base member 11 are a plurality of vertical guides 21 which slidably support a plurality of clamping members 22.

Each of the clamping members 22 comprises two sections 23 and 24 having semi-circular grooves cooperating to accommodate a shell portion 28 of a plug 30 fastened to the end of the cord being tested. The sections 23 and 24 may be clamped together to grip the plug 30 by means of a screw 31 passing through an aperture in the section 23 and threaded into the section 24.

Slidably supported by vertical guides 32 and 33 formed on the inner sides of the uprights 12 and 13 is a clamping member 35 for holding a plurality of jacks 36. Each of the jacks 36 is designed to engage one of the plugs 30 when the clamping member 35 is moved upwardly by mechanism hereinafter described. The jacks 36 each comprise a pair of contact springs 37 and 38 (Fig. 3) which frictionally engage the tip and ring portions 39 and 40, respectively, of the plug 30. A forwardly projecting portion 41 of the member 35 is provided with a plurality of apertures 42 (Fig. 1), the walls of which frictionally engage the sleeve connecting portions 43 of the plugs. The springs 37 and 38 cooperate with the walls of the apertures 42 to simulate the jacks with which the plugs are used in actual service.

Rotatably journaled in brackets 44 secured to the base 11 is a horizontal shaft 45 to which is secured a cam 46. The shaft 45 is driven by an electrical motor 47 which may be actuated by any suitable source of electrical energy (not shown). The periphery of the cam 46 constantly engages a roller 48 which is rotatably mounted between a pair of spaced bars 49 (Figs. 2 and 4). One end of each of the bars 49 is pivoted on an eccentric stud shaft 50 mounted in a bracket 51 secured to the base member 11. The eccentric shaft 50 serves as a means for varying or adjusting the movement of the clamping member 35. The other ends of the bars 49 are pivotally connected to one end of a link 52, which link is pivotally connected, at its opposite end, to a pin 53 mounted in parallel ear portions 54 formed integral with the clamping member 35.

A vertical bar 55 is pivotally secured, at its lower end, to the pin 53 while its upper portion is guided in a suitable slot provided therefor in the upper cross piece 14. Rotatably mounted on one side of the bar 55 is a roller 57 which is adapted to engage a slot 58 formed in an outwardly projecting portion 60 of the cord supporting member 15.

In the operation of the above described apparatus, the plug ends of the cords are secured in the individual clamps 22 and the cords are clamped in the member 15 so that the clamps 22 are normally spaced a predetermined distance from the top of the member 35, as shown in Fig. 1. The motor 47 is then started in the usual manner, thereby rotating the cam 46. Each revolution of the cam 46 completes one cycle in the operation of the apparatus. At the beginning of each cycle, the member 35 is in its lowermost position and the roller 48 is engaged by the lowest point on the periphery of the cam 46. As the cam is rotated in a clockwise direction (Fig. 2), the lever comprising the bars 49 is turned on its pivot 50 in a counterclockwise direction, thereby moving the member 35 upwardly along the guides 32 and 33. In so doing, the springs 37 and 38 of each jack 36 engage the tip and ring portions 39 and 40, respectively, of the corresponding plug, and the sleeve portions 43 are engaged by the walls of the apertures 42. Continuing to move upwardly the member 35 lifts the clamping members 22, moving them upwardly along the vertical guides 32 and 33. The bar 55 is also moved upwardly by the member 35 causing the roller 57 to engage the slot 58, thereby turning the member 15 in a clockwise direction.

The apparatus is so designed that when the roller 28 is engaged by the highest point on the periphery of the cam 46, the roller 57 has risen sufficiently to turn the member 15 ninety degrees in a clockwise direction, thus causing loops to be formed in the cords, as indicated in Fig. 5, and those portions of the loops which are adjacent to the plugs are forced against the side of the member 15. The member 35 then drops to its original position due to the contour of the cam 46 whereby the loops are straightened and the jacks 36 are suddenly disengaged from the plugs. The member 15 is also turned to its original position by the roller 57 during the downward movement of the member 55. This completes one cycle in the operation of the apparatus which is repeated during each revolution of the cam 46.

It is evident that the above described cycle may be repeated with any desired frequency so that the number of similar operations to which the cords would be subjected in actual service over an extended period may be performed within a comparatively short length of time, thus materially reducing the time for testing them. Furthermore, it is obvious that the various elements of the apparatus may be so designed as to subject the cords being tested to any desired predetermined pressure, tension or other forces to determine their physical characteristics.

Although the invention as herein illustrated and described is particularly well adapted for testing the life of telephone switchboard cords, it should be understood that the invention is capable of other applications and should be limited only by the scope of the appended claims.

What is claimed is:

1. A method of testing a flexible strand, which consists in forming an untensioned bend in a portion of the strand, subjecting a part of the bent portion to a predetermined frictional pressure and then straightening said bent portion.

2. A method of testing a flexible strand having a connecting terminal, which consists in forming a definite loop in a portion of the strand adjacent to the terminal, subjecting a part of the looped portion to a predetermined frictional pressure, and then straightening said looped portion and subjecting the strand to a predetermined tension.

3. A method of testing a flexible strand having a terminal for connection with a jack, which consists in clamping the strand at separated points, frictionally engaging the terminal with the jack, introducing a loop in the portion of the strand between the separated points, subjecting a part of the looped portion to a predetermined frictional pressure and subsequently straightening the loop and disengaging the jack from the terminal.

4. A method of testing a flexible electrical conductor terminating in a plug for connection with a jack, which consists in clamping the conductor at a point removed from the plug, moving the jack to frictionally engage the plug, moving the plug and jack to form a definite loop in the portion of the conductor adjacent to the plug, subjecting a part of the looped portion to a predetermined friction, and subsequently moving the plug and jack to their original positions to straighten the loop and disengage the jack from the plug.

5. In an apparatus for testing a flexible strand, means for forming an untensioned loop in a portion of the strand, means for subjecting a part of said loop to a predetermined frictional pressure, and means for thereafter straightening said looped portion.

6. In an apparatus for testing a flexible strand having a connecting terminal, means for clamping the terminal, means for clamping the strand at a point removed from the terminal, means for relatively moving said two clamping means to form a loop in the portion of the strand therebetween, and means for reversely moving said clamping means for straightening said looped portion.

7. In an apparatus for testing a flexible strand having a connecting terminal, means for clamping the terminal, means for clamping the strand at a point removed from the terminal and having a surface for frictionally engaging a portion of the strand at a different point, means for causing a relative movement between said clamping means to form a loop in the portion of the strand positioned therebetween, means for relatively moving the clamping means to engage the loop with said surface, and means for reversely moving the clamping means for straightening the looped portion and subjecting it to a predetermined tension.

8. In an apparatus for testing a flexible strand having a terminal for connection with a jack, a supporting frame, a member rotatably supported thereby for holding the strand at a point removed from the terminal, a member for clamping the terminal slidably supported by the frame, means for holding the jack, common means for moving the jack to frictionally engage the terminal and for causing a relative movement between the strand holding member and the terminal clamping member to form a loop in the portion of the strand therebetween, and means for rotating the strand supporting member to frictionally engage said loop with a side thereof.

9. In an apparatus for testing a flexible electrical conductor terminating in a plug for engagement with a jack, a frame, individual means for holding the plug and the jack, a member rotatably supported by the frame for clamping the conductor at a point removed from the plug, common means for moving the jack to frictionally engage the plug and for moving the plug and jack to form a definite loop in the conductor, and means for rotating the clamping member to cause a portion of the loop adjacent to the plug to frictionally engage said clamping member.

In witness whereof, I hereunto subscribe my name this 24th day of November, A. D. 1925.

BEN KING FORD.